United States Patent [19]

Goudriaan et al.

[11] Patent Number: 4,598,059

[45] Date of Patent: Jul. 1, 1986

[54] PROCESS FOR THE IN SITU FLUORINATION OF A CATALYST

[75] Inventors: Frans Goudriaan, Amsterdam; Timothy S. Hake; Peter Ladeur, both of The Hague, all of Netherlands; Patrique Moureaux, Grand-Couronne; Jean-Paul Saint, Petit-Couronne, both of France; Nicolaas van Dijk, The Hague, Netherlands

[73] Assignee: Shell Oil Company, Houston, Tex.

[21] Appl. No.: 706,370

[22] Filed: Feb. 27, 1985

[30] Foreign Application Priority Data

Feb. 28, 1984 [FR] France ............................... 84 03049

[51] Int. Cl.$^4$ ............................................. B01J 27/12
[52] U.S. Cl. .................................. 502/228; 502/220; 502/221; 502/224; 502/230; 208/116; 208/117
[58] Field of Search ............... 502/220, 221, 224, 228, 502/230

[56] References Cited

U.S. PATENT DOCUMENTS

| 3,717,586 | 2/1973 | Suggitt et al. | 502/221 X |
| 4,032,474 | 6/1977 | Goudriaan et al. | 502/228 |
| 4,279,778 | 7/1981 | Pott et al. | 502/221 |

FOREIGN PATENT DOCUMENTS 2024642  1/1980  United Kingdom.

*Primary Examiner*—Patrick P. Garvin
*Attorney, Agent, or Firm*—Kimbley L. Muller

[57] ABSTRACT

The present invention comprises a process for in situ fluorinating a catalyst by passing a gas containing hydrogen through a catalyst bed, injecting a gaseous organic fluorine compound into the gas and recycling the gas at such a low temperature and during such a long period that more than 50% of the fluorine compound is physically adsorbed on the catalyst, and then increasing the temperature of the bed so as to finish the in situ fluorination.

12 Claims, 4 Drawing Figures

PROCESS FOR THE IN SITU FLUORINATION OF A CATALYST

FIELD OF THE INVENTION

The invention relates to a process for the in situ fluorination of a catalyst by contacting the catalyst with a predetermined amount of a gaseous organic fluorine compound. The invention further relates to a catalyst which has been fluorinated by the said process and to a process for the catalytic conversion of hydrocarbons by means of said catalyst.

The catalyst is fluorinated in situ, i.e. in the reactor itself in which the catalyst is to exert its catalytic influence on the conversion of hydrocarbons.

BACKGROUND OF THE INVENTION

The activity and selectivity of some catalysts may be improved by fluorination of the catalysts. During fluorination the gaseous organic fluorine compound reacts with hydrogen and the catalyst with formation of the corresponding defluorinated organic compound, fluorinated catalyst and water. According to a process known from British Patent Specification No. 2,024,642 a gaseous organic fluorine compound is contacted in the reactor with the catalyst at elevated temperature and pressure, the reactor effluent gas being recycled and the duration of the injection of the organic fluorine compound into the gas being reduced to one impulsion.

According to the Examples described in this prior specification, the gaseous organic fluorine compound was injected in one second into the recycle gas at 150° C. and after the recycle gas had been homogenized the temperature was gradually brought to 190° C. The period required for homogenizing was less than one hour. This known process usually results in a generally uniform distribution of fluorine over the catalyst. In that specification, by a uniform distribution of fluorine over the catalyst is meant a distribution of fluorine in which the quotient of the fluorine content of the catalyst at the end of the catalyst bed ($F_2$) and the fluorine content of the catalyst at the beginning of the catalyst bed ($F_1$) may vary between 0.5 and 1.5.

It is an object of the present invention to achieve a still more uniform distribution of fluorine over the catalyst in a more practical manner.

SUMMARY OF THE INVENTION

Accordingly, the present invention provides a process for the in situ fluorination of a catalyst by contacting the catalyst with a predetermined amount of a gaseous organic fluorine compound, characterized in that the process comprises the following consecutive steps:

step (a) passing a gas containing hydrogen through a reactor containing a bed of catalyst particles, injecting a gaseous organic fluorine compound into said gas, withdrawing gas containing hydrogen and said gaseous organic fluorine compound from the reactor and keeping the catalyst at such a low temperature and recycling the gas withdrawn from the reactor during such a long period through the reactor that more than 50 percent of the amount of the gaseous organic fluorine compound that has been injected is physically adsorbed on the catalyst, and step (b) maintaining the temperature of the reactor at a temperature higher than that used in step (a) after more than 50 percent of the amount of the gaseous organic fluorine compound that has been injected has been physically adsorbed on the catalyst.

DETAILED DESCRIPTION OF THE INVENTION

Figure 1:
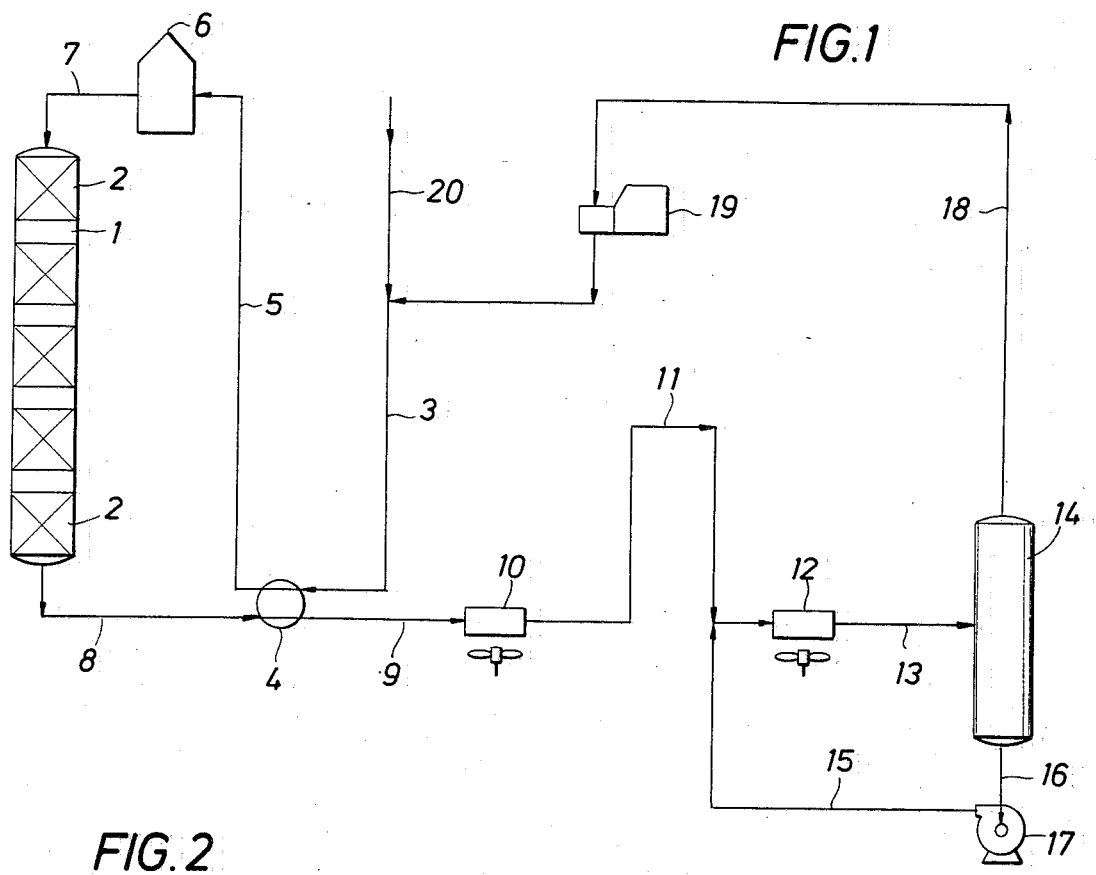
FIG. 1 is a diagrammatic representation of one aspect of the process according to the invention.

The gaseous organic fluorine compound injected into the gas in step (a) is used in three manners in the following three portions:

(1) a first portion physically adsorbed on the catalyst;

(2) a second portion converted into defluorinated organic compound, and (3) a third portion present in the recycle gas.

It has been discovered that the first portion is very uniformly distributed over the catalyst. This first portion is converted in step (b) to yield a fluorinated catalyst with preservation of this very uniform distribution. Therefore, a substantial amount and, according to the invention, more than 50 percent of the amount of the gaseous organic fluorine compound that has been injected should be physically adsorbed on the catalyst in step (a). This is achieved by applying a relatively low temperature in step (a). According as the temperature is lower the first portion mentioned hereinbefore is larger and the second portion smaller. The most suitable temperature depends on the particular catalyst and the particular gaseous organic fluorine compound which is being used and can easily be determined by simple experiments. Usually, step (a) will be carried out at a temperature below 145° C. and, often, at a temperature in the range of from 120° C. to 145° C.

It has furthermore been found that the gaseous organic fluorine compound is relatively slowly adsorbed by the catalyst. The period of less than one hour required for simply homogenizing the gas as described hereinbefore with relation to British Patent Specification No. 2,024,642 is not sufficient: in this known process hardly any gaseous organic fluorine compound is physically adsorbed on the catalyst. The period during which the gas in step (a) is recycled through the reactor depends on the temperature, the particular gaseous organic fluorine compound and the amount that has been injected. This period can easily be determined by simple experiments and will usually be in the range of from 10 to 75 hours.

In order to achieve that the gaseous organic fluorine compound is present in the gas withdrawn from the reactor, so that the catalyst is uniformly covered with physically adsorbed gaseous organic fluorine compound from the top to the bottom of the catalyst bed, a space velocity of usually at least 100 Nl gas/(l catalyst)(h) will be applied. Suitably, the space velocity is not more than 1000 Nl gas/(l catalyst)(h), the volume of the catalyst referring to the bulk volume.

The gaseous organic fluorine compound should be injected into the recycle gas in step (a) at a rate which exceeds the sum of the rate at which said physical adsorption takes place and the rate at which the gaseous organic fluorine compound is converted into defluorinated organic compound, because otherwise the gas withdrawn from the reactor does not contain gaseous organic fluorine compound. It is preferred to inject the gaseous organic fluorine compound in a gradual manner and to spread the injection over at least most of the period during which step (a) is carried out.

The gaseous organic fluorine compound may be injected into the gas at any suitable point. It is preferred to inject the gaseous organic fluorine compound into the gas upstream of the bed of catalyst particles, for example upstream of the reactor.

In step (b) the temperature is increased so as to react gaseous organic fluorine compound (the amount which is physically adsorbed on the catalyst and the amount which is present in the gas) with hydrogen and the catalyst, with formation of the corresponding defluorinated organic compound, fluorinated catalyst and water.

The most suitable temperature to be used in a given case in step (b) can easily be determined by means of simple experiments in which the contents of gaseous organic fluorine compound and the corresponding defluorinated organic compound in the gas and the total amount of gaseous organic fluorine compound that has been injected are measured. Step (b) is suitably carried out at a temperature of 160° to 225° C. It is an attractive feature of the present invention that the adsorption in step (a) can be carried out at a temperature which is only slightly lower than the fluorination in step (b), for example 10° to 50° C. lower.

In some cases, not all of the predetermined amount of gaseous organic fluorine compound may be injected in step (a) only, so as to reduce the period required for the fluorination. In this case, suitably a portion of the predetermined amount is injected in step (a) and the balance thereof in step (b). It is also possible to carry out the sequence of steps (a) and (b) twice or three times.

The gas preferably has a pressure of 10 to 50 and, more preferably, from 25 to 45 bar.

Examples of gaseous organic fluorine compounds which may be used in the process according to the invention are 1,2-difluoroethane, o-fluorotoluene, hexafluoroethane, tert-butylfluoride, hexafluoroacetone, octafluoropropane, 1-fluoro-2-methylpropane, decafluorodiethylether and hexafluorobenzene. The preferred gaseous organic fluorine compound is 1,1-difluoroethane: this compound has a low boiling point and the recycle gas can easily be measured for the quantity of ethane which is formed as defluorinated organic compound. Mixtures of two or more gaseous organic fluorine compounds may be used.

The hydrogen is suitably present in a ratio to gaseous organic fluorine compound of 1 to 100 mol of hydrogen per atom of fluorine in one mol of the organic fluorine compound. During fluorination hydrogen may be supplied to the gas being recycled to compensate for the hydrogen consumed.

To prevent the equipment from being attacked by corrosion, the gas being recycled is preferably washed with water. In this manner the recirculation gas system is freed from any traces of highly corrosive hydrogen fluoride formed during the decomposition of the gaseous organic fluorine compound and not used for fluorination of the catalyst.

The process according to the invention is in particular suitable for obtaining a uniform fluorine distribution in the in situ fluorination of a fixed bed of catalyst particles. The process is above all of importance for the in situ fluorination of a fixed bed of catalyst particles which contain one or more metals having hydrogenative activity, supported on a carrier. Such catalysts are used on a large scale in the petroleum industry for the conversion of hydrocarbon fractions in the presence of hydrogen. For this purpose it is preferred to use catalysts which contain one or more metals chosen from Groups 6b, 7b and 8 of the Periodic Table of the Elements, supported on a carrier. The Periodic Table of the Elements referred to herein is shown on the inside cover of "Handbook of Chemistry and Physics", 63rd edition (1982–1983), The Chemical Rubber Co. As catalytically active metal component the catalysts may contain both one or more noble metals and one or more base metals. Catalysts having as catalytically active metal component one or more noble metals generally contain 0.5–5 parts by weight and preferably 0.1–2 parts by weight of metal per 100 parts by weight of carrier. Very suitable noble metals are palladium and platinum. The catalysts which contain as catalytically active metal component one or more noble metals are preferably used in reduced form. Catalysts having as catalytically active metal component a base metal or a combination of base metals, generally contain 1–150 parts by weight of metal per 100 parts by weight of carrier. The quantity of metal which must be present on these catalysts is to a large extent determined by the nature of the process for which the catalyst is intended. Very suitable metal combinations consist of one or more metals of Groups 6b and 7b and, in addition, one or more metals from the iron group; particularly suitable are combinations which contain molybdenum and/or tungsten and, in addition, nickel and/or cobalt. Very good results have been obtained with catalysts containing nickel and tungsten. The catalysts which contain as catalytically active metal component one or more base metals are preferably used in sulfided form.

Suitable carriers for the present catalysts are both amorphous and crystalline materials. Examples of amorphous carriers are oxides of the elements from groups 2, 3 and 4 of the Periodic Table of the Elements, such as silica, alumina, magnesia, zirconia, thorium dioxide and titanium dioxide and mixtures of these oxides such as silica-alumina and silica-zirconia. Examples of crystalline carriers are zeolites, such as faujasite. If desired, mixtures of amorphous and crystalline materials may be used as carriers. Very good results have been obtained with alumina. Examples of aluminas are eta-alumina and gamma-alumina. The alumina suitably has a surface area of 50 to 800 m$^2$/g, measured according to the BET method as described in "Catalysis", Volume 1, edited by PH H. Emmett (1954), pages 36–42.

The quantity of fluorine applied to the catalysts in the process according to the invention may vary within wide limits, depending inter alia on the catalytically active metal component which is present on the catalyst and the purpose for which it is desired to use the catalyst. If the catalyst contains one or more noble metals, the quantity of fluorine is preferably 0.1–7.5 parts by weight and in particular 0.5–5 parts by weight per 100 parts by weight of carrier material. If the catalyst contains one or more base metals, the quantity of fluorine is preferably 0.5–15 parts by weight and in particular 1–10 parts by weight per 100 parts by weight of carrier material. When the predetermined amount of fluorine compound has been added recirculation of the reactor effluent gas is continued in step (b) until this compound has obtained a partial pressure which is acceptably low, suitably below 5 millibar.

In addition to a process for the fluorination of a catalyst, the invention relates to a catalyst fluorinated by the process described hereinbefore, to a process for the catalytic conversion of hydrocarbons at elevated temperature and pressure in the presence of hydrogen, in which process use is made of the catalyst mentioned hereinbefore and to the hydrocarbons obtained by means of said process. Examples of such processes in which in situ fluorinated catalysts according to the invention are preferably used are as follows:

1. The hydrocracking of heavy hydrocarbon oils, such as flashed distillate for the preparation of light hydrocarbon distillates such as gasolines and kerosines.
2. The preparation of high-viscosity-index lubricating oils by means of a catalytic hydrogen treatment of heavy hydrocarbon oils such as deasphalted oils and oil-containing paraffin mixtures.
3. The hydrogenation of aromatics present in light hydrocarbon oil distillates, such as kerosines.
4. The hydroisomerization or hydrocracking of unbranched paraffins present in light hydrocarbon oil distillates in order to increase the octane number of these distillates.

The invention will now be elucidated with reference to the following example, however, the invention is not to be limited to the particular reactants and conditions employed.

EXAMPLE

A reactor 1 for the hydrocracking of hydrocarbons was charged with 26.3 tons of a sulfided catalyst containing 5.2% by weight of nickel and 22% by weight of tungsten and 1.8% by weight of fluorine (said percentages calculated on the total catalyst) on an alumina carrier having a surface area of 110 m$^2$/g. The fluorine content of the catalyst at the end of the bed divided by that at the beginning was 1.0. The catalyst was present in equally sized beds 2.

A gas containing 85% by volume of hydrogen and 15% by volume of alkanes and having a starting pressure of 31 bar and a temperature of 140° C. was introduced via a line 3, a heat exchanger 4, a line 5, a heater 6 and a line 7 into the reactor 1. The gas was conducted through the reactor 1 with a space velocity of 345-490 Nl/(l catalyst)(h). Gas was withdrawn from the reactor 2 via a line 8 and conducted via the heat exchanger 4, a line 9, a cooler 10, a line 11, an air cooler 12 and a line 13 to a separator 14. The gas was washed in the air cooler 12 with an aqueous solution containing ammonia and having a pH of 8.5. The water was introduced into the line 11 via a line 15. Aqueous solution was withdrawn from the separator 14 via a line 16 and recirculated to the line 15 via a pump 17. Washed gas was withdrawn from the separator 14 via a line 18 and conducted via a compressor 19 into the line 3.

The catalyst had to be contacted with a predetermined amount of 13.5 kmol of 1,1-difluoroethane (DFE). For this purpose, DFE (9.0 kmol) was injected via a line 20 into the line 3 at a constant rate over a period of 18 hours. At the end of this period the partial pressure of DFE in the recycle gas was 0.3 bar. Table 1 shows in what manner the DFE was used.

TABLE 1

|  | kmol |
|---|---|
| DFE adsorbed on catalyst | 6.3 |
| DFE converted into ethane | 1.7 |
| DFE present in recycle gas | 1.0 |

TABLE 1-continued

|  | kmol |
|---|---|
| Total amount of DFE injected | 9.0 |

Table 1 shows that about 65% of the amount of gaseous organic fluorine compound that has been injected has been physically adsorbed on the catalyst.

Figure 2:
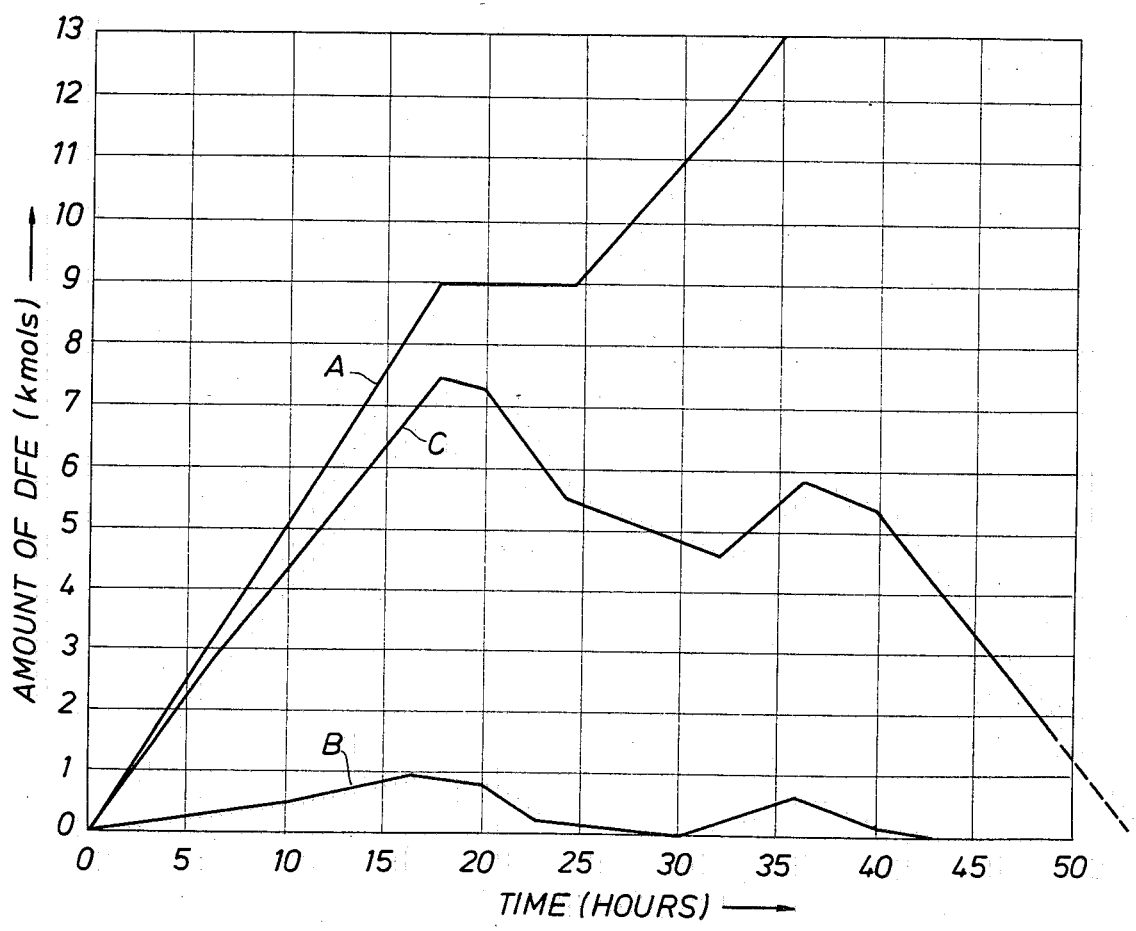
FIG. 2 is a plot of the amount of DFE versus time.

During the injection period of 18 hours the contents of DFE and ethane in the recycle gas increased as a linear function of the time. This is shown in FIG. 2 in which the amount of DFE, expressed in kmol, is plotted on the vertical axis and the time, expressed in hours, on the horizontal axis. Line A refers to the total amount of DFE that has been injected into line 3, line B to the amount of DFE in the recycle gas and line C to the sum of the amount of DFE in the recycle gas and that physically adsorbed on the catalyst.

Figure 3:
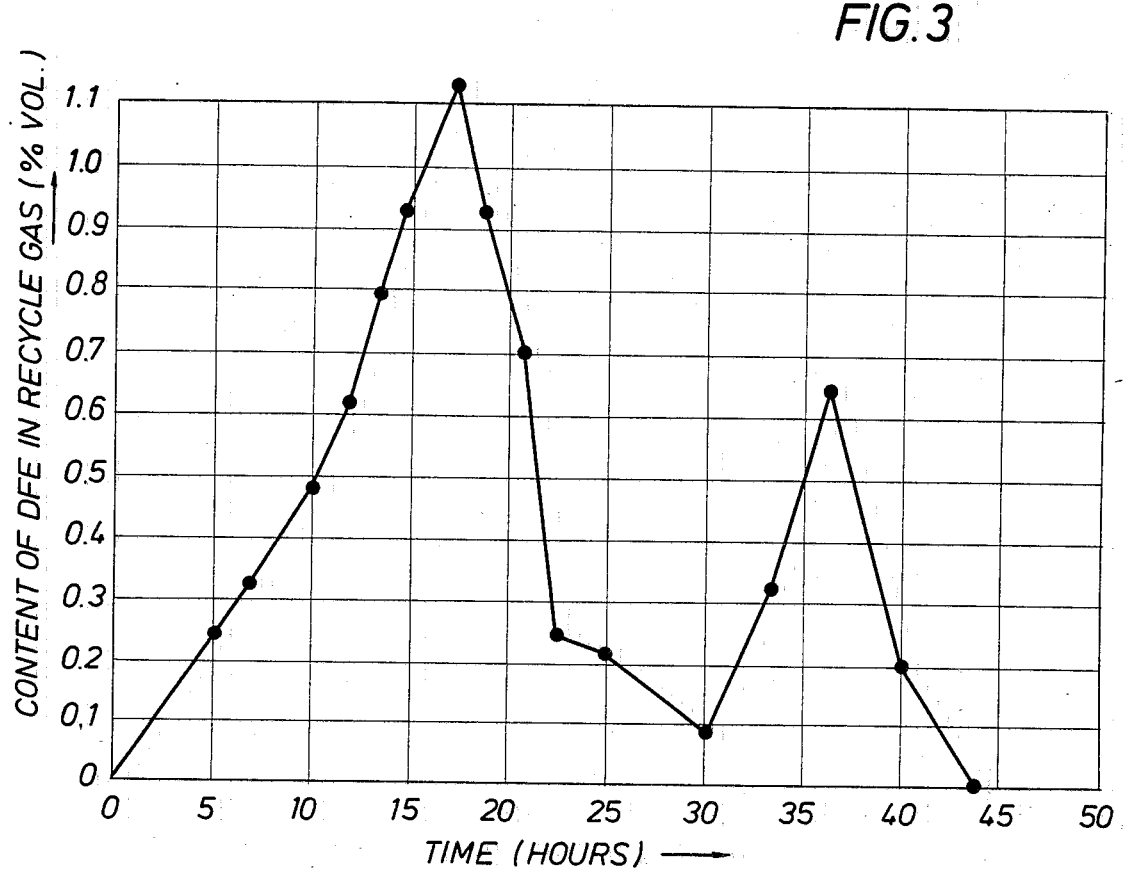
FIG. 3 is a plot of the content of DFE in the recycle gas expressed as a percent by volume versus time.

In FIG. 3 the content of DFE in the recycle gas in line 7, expressed in percent by volume, is plotted on the vertical axis and the time, expressed in hours, on the horizontal axis. Each circle in this Figure represents the results of an analysis. As expected from the position of line B in FIG. 2, the content of DFE in the recycle gas increases linearly with time over the said injection period of 18 hours.

From the position of lines A, B and C it follows that DFE was adsorbed on the catalyst at a constant rate throughout the period of 18 hours. This observation points to a zero order adsorption rate, this rate being independent on the partial pressure of DFE in the recycle gas. The zero order kinetics result in a very uniform physical adsorption of DFE on the catalyst.

The temperature of the reactor was brought over a period of 2 hours to 165° C. by using heater 6 and kept at this value for 12 hours. No DFE was injected during these two hours and the subsequent 4 hours. Then, DFE (2.7 kmol) was injected into the recycle gas at a constant rate over the remaining 8 hours. At the end of these remaining 8 hours the partial pressure of DFE in the recycle gas was 0.1 bar. Table 2 shows in what manner the DFE was used.

TABLE 2

|  | kmol |
|---|---|
| DFE adsorbed on catalyst | 4.3 |
| DFE converted into ethane | 7.2 |
| DFE present in recycle gas | 0.2 |
| Total amount of DFE injected | 11.7 |

From Table 2 and the position of lines A, B and C between 18 and 32 l hours it follows that substantial fluorination has taken place and that DFE has not desorbed substantially from the increase of the reactor temperature.

In order to determine the temperature dependence of the conversion of DFE to ethane the temperature of the reactor was decreased to 155° C. 32 hours after start and kept at this value for 8 hours. During the first half of these 8 hours DFE (1.8 kmol) was injected into the recycle gas at a constant rate, then injection was terminated. At the end of these 8 hours the partial pressure of DFE in the recycle gas was 0.1 bar. Table 3 presents data found after 36 and 40 hours.

TABLE 3

|  | after 36 hours kmol | after 40 hours kmol |
| --- | --- | --- |
| DFE adsorbed on catalyst | 5.2 | 5.1 |
| DFE converted into ethane | 7.7 | 8.2 |
| DFE present in recycle gas | 0.6 | 0.2 |
| Total amount of DFE injected | 13.5 | 13.5 |

Then, the temperature of the reactor was increased to 220° C. over a period of 8 hours, no DFE being injected. Table 4 presents the data found at the end of these 8 hours.

TABLE 4

|  | kmol |
| --- | --- |
| DFE adsorbed on catalyst | 2.1 |
| DFE converted into ethane | 11.4 |
| DFE present in recycle gas | 0.0 |
| Total amount of DFE injected | 13.5 |

Figure 4:
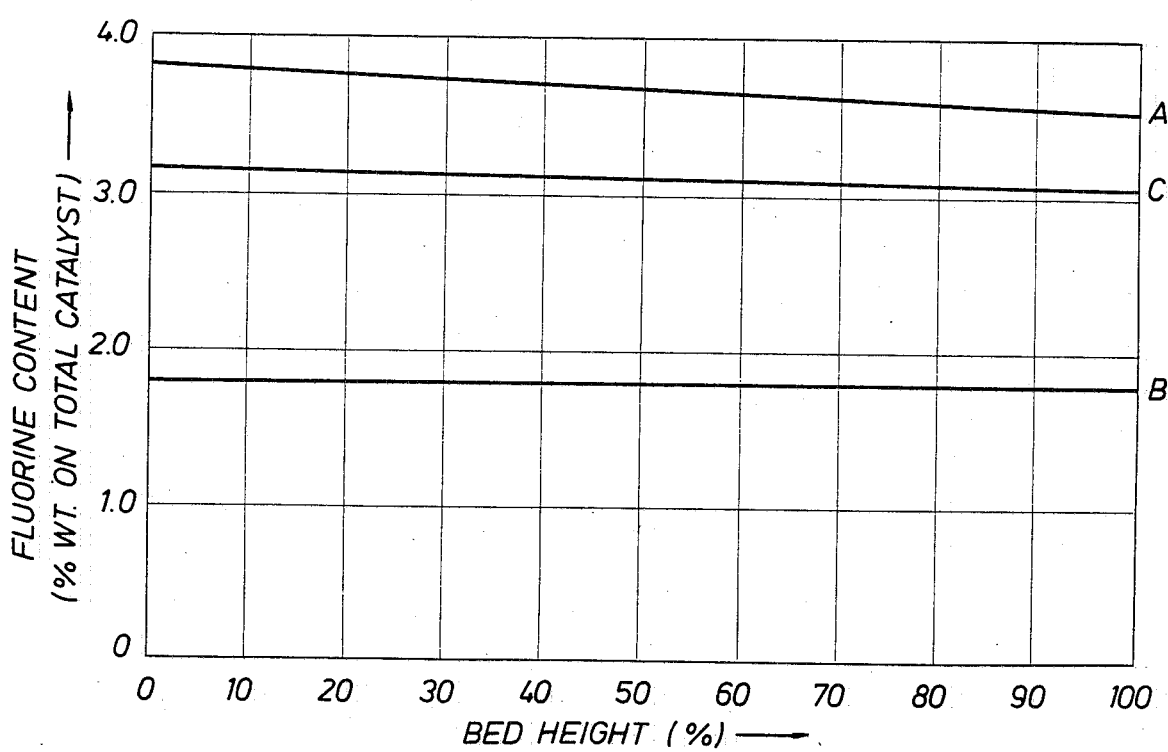
FIG. 4 is a plot of the content of fluorine expressed as a percent by weight versus bed height.

In FIG. 4 the fluorine content, expressed in percent by weight calculated on total catalyst, is plotted on the vertical axis and the bed height, expressed in a percentage, is plotted on the horizontal axis, 0 and 100 percent referring to the top and bottom of the bed, respectively. Line A is the graphical representation of the total fluorine content, line B represents the fluorine content of 1.8% by weight prior to the experiment and line C represents this fluorine content of 1.8% by weight increased with the fluorine content resulting from the conversion of physically adsorbed DFE. FIG. 4 shows that the experiment resulted in a very uniform distribution of fluorine, the fluorine content at the top and bottom being 3.80 and 3.55% by weight, respectively.

It was found that the catalyst thus fluorided was as active in hydrocracking gas oil as a fresh catalyst.

The hydrogen fluoride contents of the wash water before and after the fluoriding were 10 and 20 parts per million by weight, respectively.

What is claimed is:

1. A process for the in situ fluorination of a catalyst by contact of said catalyst with a predetermined amount of a gaseous organic fluorine compound by a multiple sequential process which comprises:
   (a) passing a first gas stream comprising hydrogen through a reactor containing said catalyst and injecting into said first gas stream said amount of said gaseous organic fluorine compound;
   (b) withdrawing a second gas stream, as a recycle gas stream, containing hydrogen and said gaseous organic fluorine compound from said reactor and periodically injecting therein said gaseous organic fluorine compound at a rate which exceeds the sum of the rate at which physical adsorption of said gaseous organic fluorine compound occurs on said catalyst;
   (c) recycling said second gas stream to said reactor to further contact said hydrogen and said gaseous organic fluorine compound with said catalyst;
   (d) maintaining said catalyst during fluorine compound adsoprtion thereon at a temperature less than 145° C. for a period of time to effect that more than 50% of the amount of said gaseous fluorine compound injected in step (a) is physically adsorbed on the catalyst; and
   (e) maintaining said catalyst at a higher temperature value of from 160° C. to 225° C. after said point of absorption of more than 50% of said fluorine compound on said catalyst has been reached.

2. The process of claim 1 wherein the temperature in step (d) is above 120° C.

3. The process of claim 1 wherein the first gas stream is conducted through the reactor with a space velocity in the range of from 100 to 1000 Nl/(l catalyst)(h).

4. The process of claim 1 wherein in step (c) the second gas stream is recycled during a period in the range of from 10 to 75 hours.

5. the process of claim 1 wherein the hydrogen partial pressure is 10 to 50 bar in the second gas stream.

6. The process of claim 5 wherein the hydrogen partial pressure is 25 to 45 bar in the second gas stream.

7. The process of claim 1 wherein a portion of the predetermined amount of the gaseous organic fluorine compound is injected in step (a) and the balance thereof in step (e).

8. The process of claim 1 wherein the predetermined amount of gaseous organic fluorine compound is 0.1 to 15 percent by weight of fluorine, calculated on the total weight of the catalyst to be fluorinated.

9. The process of claim 1 where the gaseous organic fluorine compound is 1,1-difluoroethane.

10. The process of claim 1 wherein the second gas stream is washed with an aqueous washing liquid before recycle to said catalyst in step (c).

11. The process of claim 1 wherein the catalyst to be fluorinated contains alumina and at least one metal of Groups 6b, 7b and 8 of the Periodic Table of the Elements.

12. The process of claim 11 wherein the catalyst to be fluorinated contains molybdenum and/or tungsten and, in addition, nickel and/or cobalt.

* * * * *